(12) United States Patent
Zougari

(10) Patent No.: US 10,995,732 B2
(45) Date of Patent: May 4, 2021

(54) WIND PLANT METHOD AND APPARATUS

(71) Applicant: Mohammed Ibn khayat Zougari, Windsor (CA)

(72) Inventor: Mohammed Ibn khayat Zougari, Windsor (CA)

(73) Assignee: Mohammed Ibn khayat Zougari, Windsor (CA)

( * ) Notice: Subject to any disclaimer, the term of this patent is extended or adjusted under 35 U.S.C. 154(b) by 0 days.

(21) Appl. No.: 16/909,151

(22) Filed: Jun. 23, 2020

(65) Prior Publication Data
US 2020/0400124 A1 Dec. 24, 2020

Related U.S. Application Data

(60) Provisional application No. 62/865,264, filed on Jun. 23, 2019.

(51) Int. Cl.
| | | |
|---|---|---|
| *F03D 9/25* | (2016.01) | |
| *F03D 1/02* | (2006.01) | |
| *F03D 3/00* | (2006.01) | |

(52) U.S. Cl.
CPC ............... *F03D 9/25* (2016.05); *F03D 1/025* (2013.01); *F03D 3/005* (2013.01); *F05B 2240/13* (2013.01); *F05B 2250/501* (2013.01)

(58) Field of Classification Search
CPC . F03D 9/25; F03D 1/025; F03D 3/005; F05B 2240/13; F05B 2250/501
See application file for complete search history.

(56) References Cited

U.S. PATENT DOCUMENTS

| | | | | |
|---|---|---|---|---|
| 2005/0236842 | A1* | 10/2005 | Alstot | F03B 13/00 290/54 |
| 2010/0244453 | A1* | 9/2010 | Doman | F03D 1/04 290/55 |
| 2011/0268565 | A1* | 11/2011 | Alvi | F03B 3/18 415/182.1 |
| 2020/0116120 | A1* | 4/2020 | Phillips | F03D 7/0224 |

* cited by examiner

*Primary Examiner* — Sean Gugger
(74) *Attorney, Agent, or Firm* — Carlson, Gaskey & Olds, P.C.

(57) ABSTRACT

A wind plant includes at least one wind collector assembly configured to collect a wind stream; at least one booster arm in fluid communication with the at least one wind collector assembly, the booster arm configured to receive the wind stream and to increase the flowrate of the wind stream; and at least one exit conduit, the at least one exit conduit in fluid communication with the booster arm and rotatable with respect to the booster arm. The at least one exit conduit is configured to rotate with respect to the at least one booster arm in response to a thrust force generated by the wind stream exiting the exit conduit. A method of capturing energy from wind is also disclosed.

16 Claims, 7 Drawing Sheets

WIND PLANT METHOD AND APPARATUS

CROSS-REFERENCE TO RELATED APPLICATIONS

This application claims priority to U.S. Provisional Patent Application Ser. No. 62/865,264 filed Jun. 23, 2019, which is hereby incorporated herein in its entirety.

BACKGROUND

Wind can be a source of renewable energy. More specifically, wind transports energy that can be harvested to produce mechanical torque. For example, lift-based horizontal axis wind turbines can be used to harvest kinetic energy from wind. Lift-based horizontal axis wind turbines have one or more blades that are aerodynamically designed to experience lift from passing wind, which causes the blades to rotate. The rotation generates a torque that can be used to produce electrical energy.

Lift-based wind turbines are limited in how efficiently they can transform energy from wind to usable electrical energy. That is, only a small fraction of the energy carried in wind is captured by these types of wind turbines. There is thus a need for improved apparatuses and methods for harvesting energy from wind.

SUMMARY

A wind plant according to an exemplary embodiment of this disclosure, among other possible things includes at least one wind collector assembly configured to collect a wind stream; at least one booster arm in fluid communication with the at least one wind collector assembly, the booster arm configured to receive the wind stream and to increase the flowrate of the wind stream; and at least one exit conduit, the at least one exit conduit in fluid communication with the booster arm and rotatable with respect to the booster arm. The at least one exit conduit is configured to rotate with respect to the at least one booster arm in response to a thrust force generated by the wind stream exiting the exit conduit.

In a further example of the foregoing, the at least one wind collector assembly includes an inner wind collector and an outer wind collector.

In a further example of any of the foregoing, the at least one wind collector assembly includes a driving turbine associated with the outer wind collector, and a driven turbine configured to be driven by the driving turbine and associated with the inner wind collector.

In a further example of any of the foregoing, the driving turbine has blades, and the blades are rotated by the wind stream.

In a further example of any of the foregoing, the blades of the driving turbine have a geometry such that the blades of the driving turbine are operable to create lift.

In a further example of any of the foregoing, the driven turbine is configured to accelerate the wind stream.

In a further example of any of the foregoing, the at least one booster arm is in fluid communication with the inner wind collector.

In a further example of any of the foregoing, the at least one booster arm is in fluid communication with the at least one wind collector assembly via a channel. The at least one booster arm has an inlet with a first cross sectional area, the channel has a second cross sectional area, and the first cross sectional area is greater than the second cross sectional area.

In a further example of any of the foregoing, an end of the channel is positioned inside the inlet of the at least one booster arm.

In a further example of any of the foregoing, the inlet of at least one booster arm is configured to receive ambient air in addition to the wind stream.

In a further example of any of the foregoing, the wind plant comprises an electrical power generator assembly operatively coupled to the at least one exit conduit.

In a further example of any of the foregoing, the electrical power generator assembly is operatively coupled to the at last one exit conduit via a shaft that is fixed to the at least one exit conduit and is configured to rotate with the at least one exit conduit.

A method of capturing energy from wind according to an exemplary embodiment of this disclosure, among other possible things includes collecting wind in a wind collector assembly; increasing the flowrate of the wind by moving the wind through a booster arm; and expelling the wind from an exit conduit, whereby a thrust force is generated on the exit conduit, causing the exit conduit to rotate with respect to the booster arm.

In a further example of the foregoing, the method comprises converting a torque associated with rotation of the exit conduit to electrical power.

In a further example of any of the foregoing, the method comprises accelerating the wind by a turbine in the wind collector assembly.

In a further example of any of the foregoing, the wind collector assembly includes an inner wind collector and an outer wind collector, the inner wind collector associated with the turbine. The inner wind collector is in fluid communication with the booster arm.

In a further example of any of the foregoing, the turbine is a driven turbine, and further comprising driving the driven turbine with a driving turbine.

In a further example of any of the foregoing, the booster arm is in fluid communication with the wind collector assembly via a channel. The booster arm has an inlet with a first cross sectional area, the channel has a second cross sectional area, and the first cross sectional area is greater than the second cross sectional area.

In a further example of any of the foregoing, an end of the channel is positioned inside the inlet of the booster arm.

In a further example of any of the foregoing, the inlet of the booster arm is configured to receive ambient air in addition to the wind. The ambient air forms a boundary layer in this booster arm.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

The present disclosure relates generally to renewable energy systems that efficiently take advantage of wind kinetic energy to produce mechanical torque, which can eventually be transformed into electrical power. In general, the present disclosure provides an apparatus and method that captures energy from wind by generating a stream that exerts a thrust force, which thrust force produces an equivalent torque in the opposite direction as will be apparent from the present disclosure. The torque can be transformed into electrical power.

Figure 1:
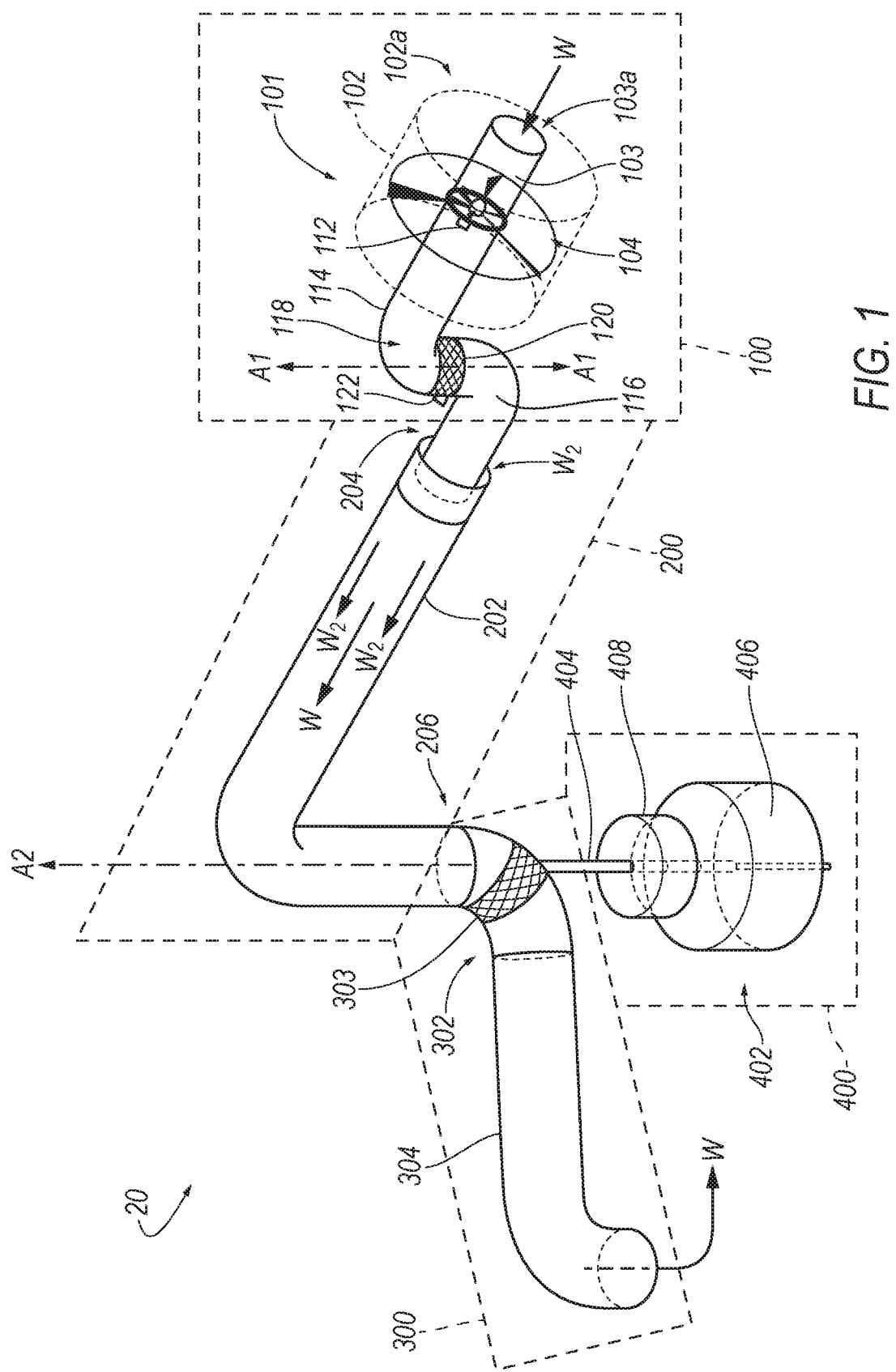
FIG. 1 shows an example wind plant.

FIG. 1 shows a wind plant 20 according to the present disclosure. The wind plant 20 is suitable for wind collection at any wind speed and/or wind properties, including for domestic/residential use, industrial/commercial use, urbane use such as utility network use, or for any other practical larger or smaller scale application. The wind plant 20 includes a first stage 100 for wind stream collection and speed enhancement; a second stage 200 for boosting the energy carried by the collected wind stream; a third stage 300 for torque production; and a fourth stage 400 for generating electrical power.

The first stage 100 includes a wind collector assembly 101. In the example of FIG. 1, the wind collector assembly 101 includes first wind collector 102 and second wind collector 103 arranged inside the first wind collector 102. The first wind collector 102 could be closed off at one axial end, as shown in FIG. 1, or open on both axial ends, in another example. The second wind collector 103 has an inlet 103a with a diameter that is smaller than an inlet 102a of the first wind collector 102, in this example. Ambient air/wind enters both of the inner and outer wind collectors 102/103 via inlets 102a/103a. The second wind collector 103 collects a wind stream W via its inlet 103a. The wind stream W travels through the wind plant 20 as discussed in more detail below.

Figure 2A:
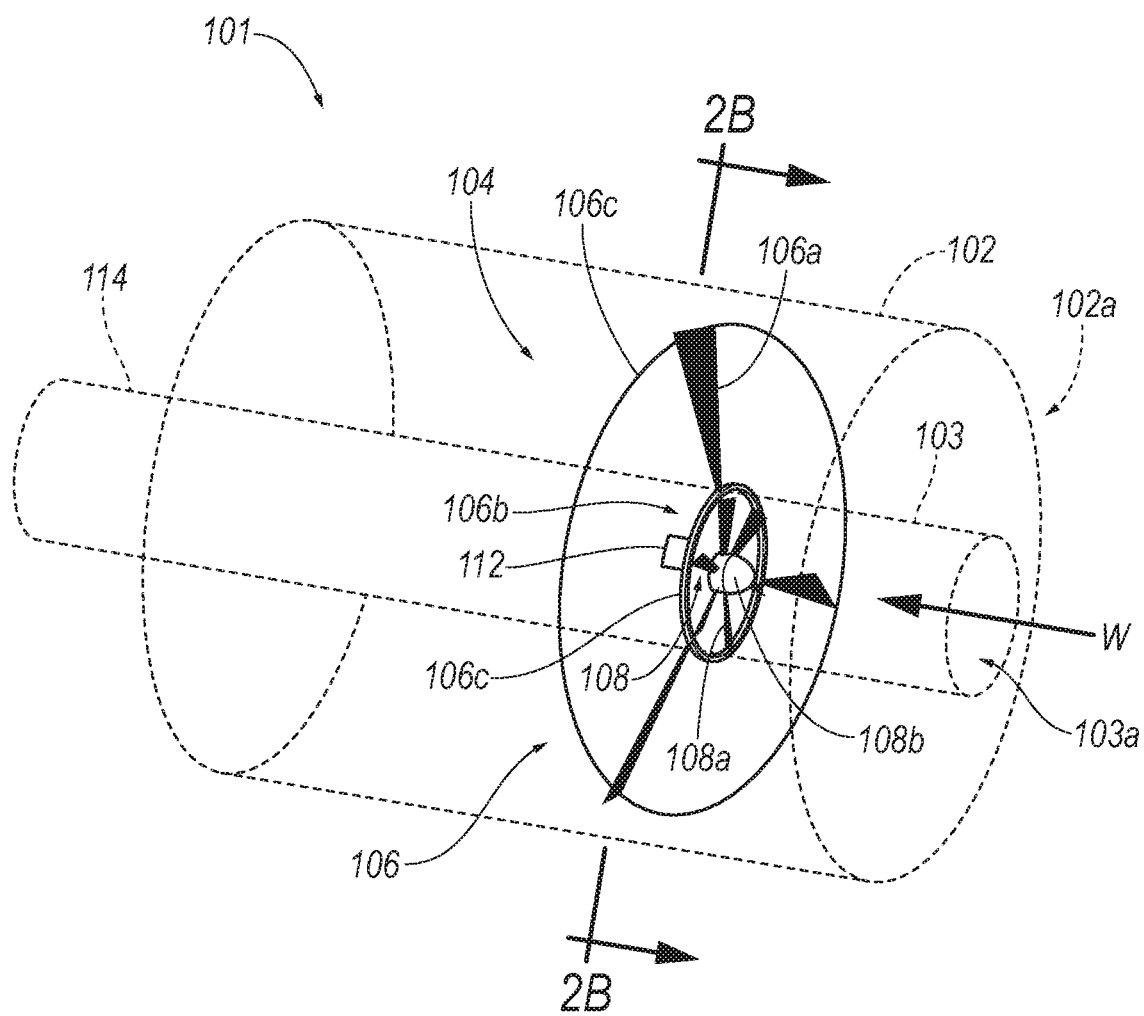
FIGS. 2A-C show a detail view of a wind collector for the example wind plant of FIG. 1.
Figure 2B:
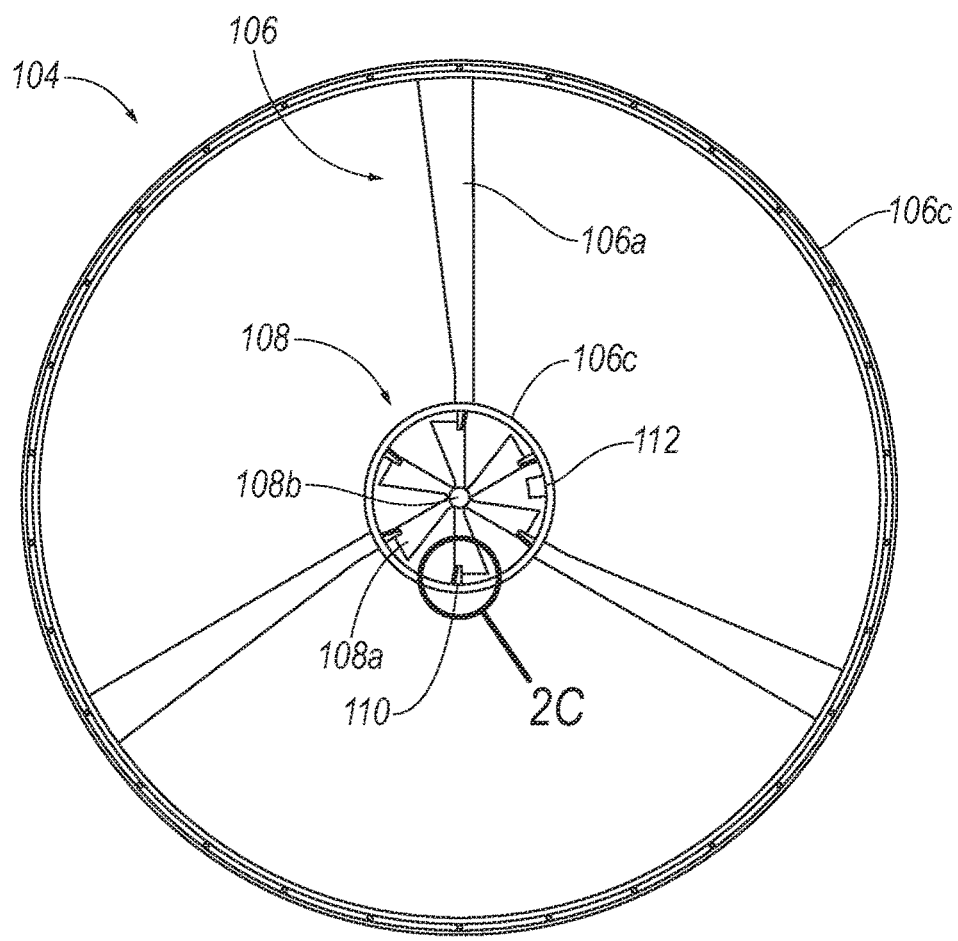
Figure 2C:
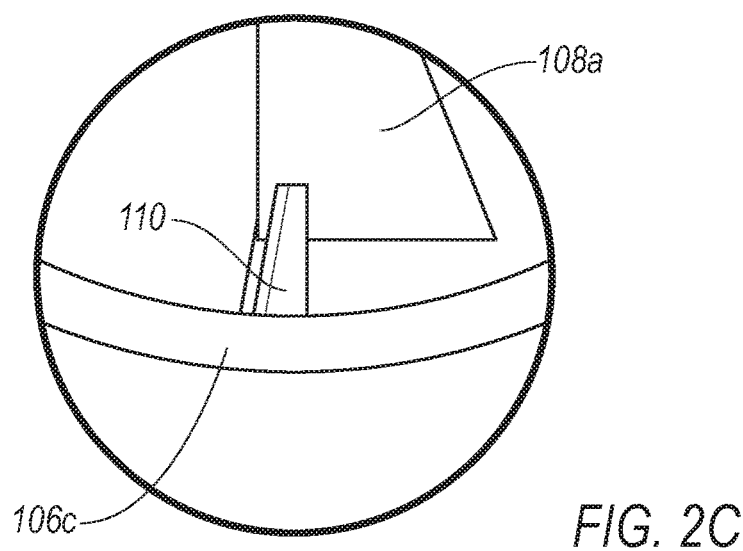

The first stage 100 also includes a turbine system 104. The turbine system 104 includes a driving turbine 106 and a driven turbine 108. FIGS. 2A-C show a detail view of the turbine system 104. The driving turbine 106 is associated with first wind collector 102 and ambient air/wind entering inlet 102a of the first wind collector 102 encounters the driving turbine 106. The driven turbine 108 is associated with the second wind collector 103 and wind stream W entering inlet 103a of the second wind collector 103 encounters the driven turbine 108.

In another example, the second wind collector 103 could be arranged downstream from the first wind collector 102 rather than inside the first wind collector 102. In yet another example, multiple second wind collectors 103 could be arranged downstream from a common first wind collector 102 and may receive wind W from the first wind collector 102 via a branched passage. Alternatively, multiple first wind collectors 102 could provide wind W to a common second wind collector 103. In these examples, the turbine system 104 is associated with the second wind collector(s) 103.

Referring to FIGS. 2A-C, though a single driving turbine 106 and a single driven turbine 108 are shown, it should be understood that more turbines 106/108 could also be employed. The driving turbine 106 is operatively coupled to the driven turbine 108 such that the driving turbine 106 drives the driven turbine 108. The driving turbine 106 has turbine blades 106a that rotate about a rotor 106b. In another example, the rotor could be a frame structure, as is schematically shown by 106c. The use of either rotor 106b and/or rotor 106c depends on the mechanism used to operatively couple the driving turbine 106 and the driven turbine 108, which is discussed in more detail below.

Wind W encountering the turbine blades 106a causes the driving turbine 106 to rotate. In a particular example, the blades 106a of the driving turbine 106 have a geometry such that they are operable to create lift as would be known in the art. In general, the driving turbine 106 is operable to act as a motor. The rotational speed of the driving turbine 106 is directly proportional to the power of the wind/ambient air in first wind collector 102 and indirectly proportional to the total turbine 106 torque. The wind/ambient air in first wind collector 102 thus acts as a power source to turn the turbine 106, which in turn turns the driven turbine 108.

As best shown in FIGS. 2A-C, one or more driving turbines 106 is operatively coupled to one or more driven turbines 108 to rotate the driven turbine 108. The driven turbine 108 also has blades 108a that rotate about a rotor 108b. In this example, the driven turbine 108 is concentrically arranged inside the driving turbine 106. In this particular example, the blades 108a of the driven turbine 108 are coupled to the rotor 106b of the driving turbine 106 via mechanical and/or magnetic couplers 110, though other arrangements are contemplated. For instance, in another example, the turbines 106/108 could be spaced apart, the driving turbine 106 could employ the rotor 106b, and the coupler 110 could be a shaft. In general, the driven turbine 108 acts as a fan to accelerate the collected wind stream W from the inlet 103a. In this way, the wind collector assembly 101 uses wind W to turn the driving turbine 106, which turns the driven turbine 108, which accelerates wind W.

In one example, the driven and driving turbines 106/108 rotate at the same speed, however, in another example, a gear box 112 could be used to decouple the driven and driving turbines 106/108 so that they rotate at different speeds. The difference in speed could be selected to enhance efficiency of the turbine system 104 and thus the overall efficiency of the wind plant 20. For example, the driven turbine 108 could rotate at a faster speed than the driving turbine 106. Generally, the faster the turbines 106/108 rotate, the more wind W is drawn into the plant 20 and the more the wind W is accelerated in the wind collector 101 by the turbine system 104.

One or both of the driven and driving turbines 106/108 could include a low-friction bearing system such as a mechanical or magnetic bearing system as are known in the art.

Also inside the wind collector assembly 101 is a channel 114. The channel 114 is in fluid communication with the second wind collector 103 downstream from the turbine system 104. The channel 114 can be continuous with the second wind collector 103, in some examples. The channel 114 is fluidly connected to an adjacent channel 116 via a rotating connection/joint 118. Any rotating connection 118 that is known in the art could be used. Therefore, the first stage 100 is rotatable about the axis A1. For example, the first stage 100 could be rotated to face wind W flow in the ambient surroundings. Furthermore, a rotary drive 120 could be included to rotate the first stage 100 about the axis A1. Any type of rotary drive 120 known in the art could be used, including one that is controlled by a controller 122, for example.

The second stage 200 includes a booster arm 202. The booster arm 202 could have a curved or straight geometry. The booster arm 202 is in fluid communication with channel 116 to receive collected wind stream W from the channel 116. The booster arm 202 has an inlet 204 and an outlet 206. The inlet and outlet 204/206 have generally similar diameters. The channel 116 has a diameter that is smaller than a diameter of the inlet 204 of the booster arm 202. In the example of FIG. 1, the channel 116 is received inside the inlet 204 of the booster arm 202. However, in another example, the channel 116 can be spaced apart from the inlet 204.

In either case, the difference in diameter between the channel 116 and the inlet 204 allows collected wind stream W from the channel 116 to enter the booster arm 202, and allows a secondary wind stream W2 to also enter the booster arm 202 from ambient air. For example, the ratio of channel 116 diameter to inlet 204 diameter could be between about 0.3 and 0.7. Because the secondary wind stream W2 is ambient wind that has not passed through the first stage 100, the secondary wind stream W2 has a lower velocity than the wind stream W. The wind stream W and secondary wind stream W2 move through the booster arm 202 towards the third stage 300. The different diameters of channel 116 and inlet 204 cause an outer boundary layer of slower wind stream W2 to form within the booster arm 202 while faster wind stream W travels generally in the center of the booster arm 202. This induces a phenomenon called forced-air-entrainment, which is a drag-like mechanism that allows a moving fluid (e.g., faster wind stream W) to entrain a fluid that is stationary relative to it (e.g., slower wind stream W2). This generally results in an additive effect of the momentum flow rates of the respective wind streams W and W2. In this way, the volume of wind can be increased by collecting wind from primary inlet (e.g., wind collector 103) and secondary inlet (e.g., inlet 204), and the flow rate of the wind W/W2 as it enters and travels through the booster arm 202 is increased.

Figure 6:
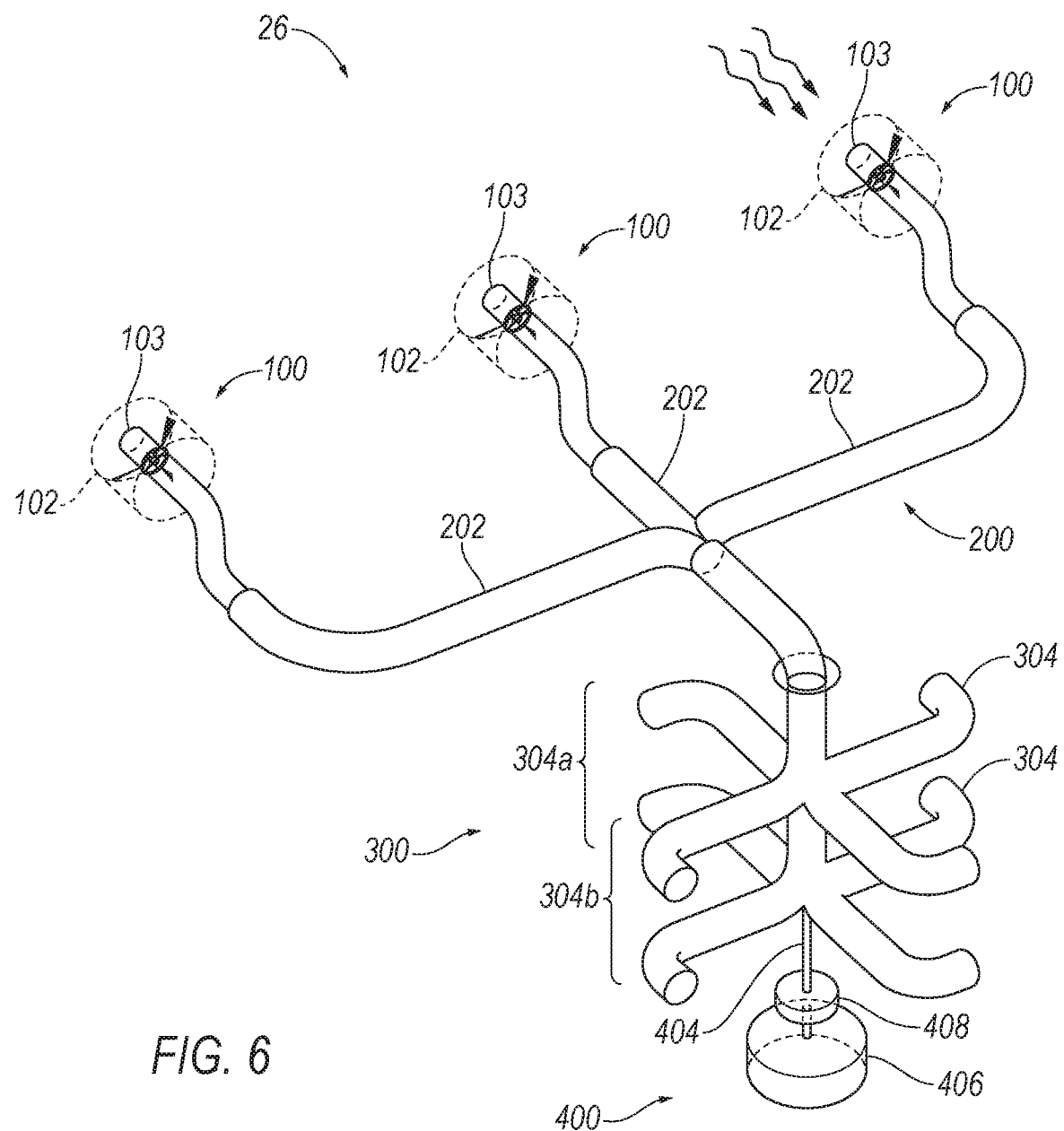
FIG. 6 shows yet another example wind plant.

Though in the example shown in FIG. 1 there is a single second stage 200, in other examples, there could be multiple second stages 200 (e.g., multiple booster arms 202) arranged in parallel or in series (such as in the example of FIG. 6, discussed in more detail below).

The third stage 300 includes a core assembly 302 and an exit conduit 304. The core assembly 302 and exit conduit 304 are in fluid communication with the second stage 200 so that fast-moving wind W moves from the exit 206 through the core assembly and out of the wind plant 20 through the exit conduit 304. The core assembly 302 connects the stage 300 to the stage 200 via a connector 303 such that the stage 300 is rotatable with respect to the second stage 200 about the axis A2. The connector 303 could include bearings or other features as would be known in the art to facilitate this rotation.

It should be understood that though the axis A2 is generally vertical with respect to the ground in FIG. 1, in other examples, the various components of the wind plant 20 could be oriented so that the axis A2 is oriented in a different manner. For instance, in the example of FIG. 5 (discussed in more detail below), the axis A2 is horizontal with respect to the ground. Other orientations are also contemplated.

In some examples, the third stage 300 could also induce forced air entrainment as in the second stage 200, discussed above. In this example, the exit 206 of the booster arm 202 has a smaller diameter than the core assembly 302 to induce a boundary layer of slower wind in the core assembly 302 and through the exit conduit 304.

As wind W exits the exit conduit 304, a thrust force is generated due to the flowrate of wind W exiting the exit conduit 304. In particular, the exit conduit 304 has a geometry and orientation that directs the wind W into a plane that is perpendicular to the axis A2 as it exits the exit conduit 304 (and therefore, in this particular example, the plane is parallel to the ground). For instance, in the example of FIG. 1, the exit conduit 304 has an elbow shape, e.g., a turn that is approximately 90 degrees, in order to achieve the desired wind W exit direction. The inlet 204 to the booster arm 202 and the exit conduit 304 have cross sectional areas that are substantially the same. This in turn allows for maintenance of wind W pressure between the inlet 204 and the exit conduit 304. The wind W thus exits the exit conduit 304 as a fast, pressurized stream W with minimal pressure loss. The stream W exerts a thrust force T on the third stage 300 opposite the direction of the wind W stream movement, which causes the rotation about the axis A2. In general, the size of the thrust force T is directly proportional to the flowrate of wind W at exit conduit 304.

Figure 3:
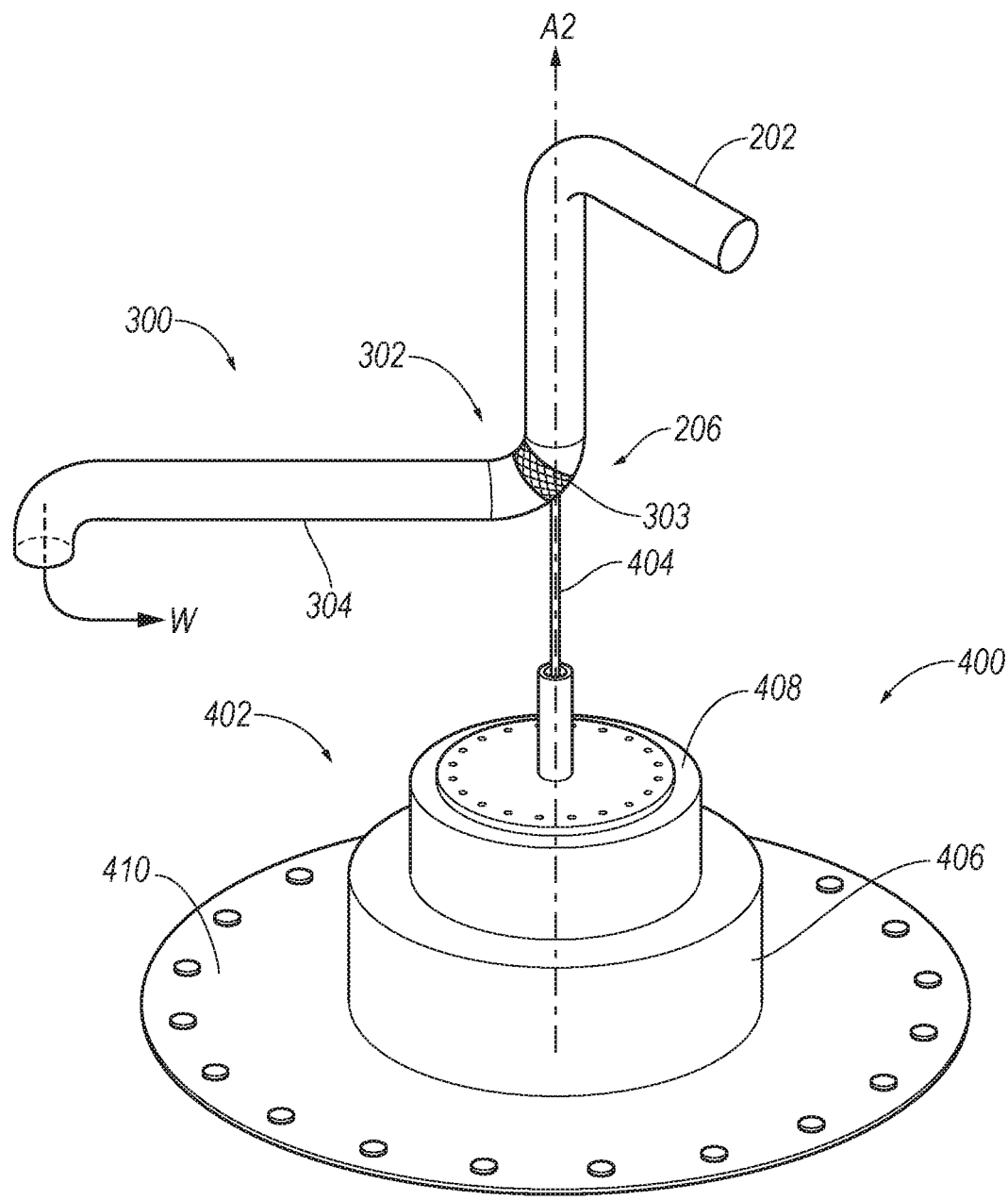
FIG. 3 shows a detail view of an example third and fourth stage for the example wind plant of FIGS. 1-2C.

As shown in FIG. 3, the fourth stage 400 includes an electrical power generator assembly 402 which is operatively coupled to the third stage 300 via a shaft 404 that extends along the axis A2. In particular, the shaft 404 is fixed to the core assembly 302 such that rotation of the third stage 300 causes the shaft 404 to rotate. The torque associated with rotation of the shaft 404 (via rotation of the third stage 300) represents energy extracted from the wind W by the plant 20.

The electrical power generator assembly 402 can be any type of electrical power generator assembly known in the art that is configured to transform rotational energy (of the shaft 404) into electrical power. For instance, the electrical power generator assembly 402 can include a rotor assembly 406 and one or more gearboxes 408 that are operatively coupled to the shaft 404. The rotor assembly 406 may include a base 410 (FIG. 3) on which the fourth stage 400 rests. Rotation of the shaft 404 causes rotation of the rotor assembly 406/gearbox(es) 408, which is used to generate electrical power as would be known in the art. Though the examples show a single electrical power generator assembly 402, in other examples, multiple electrical power generator assemblies 402 can be connected in series or in parallel.

Figure 4:
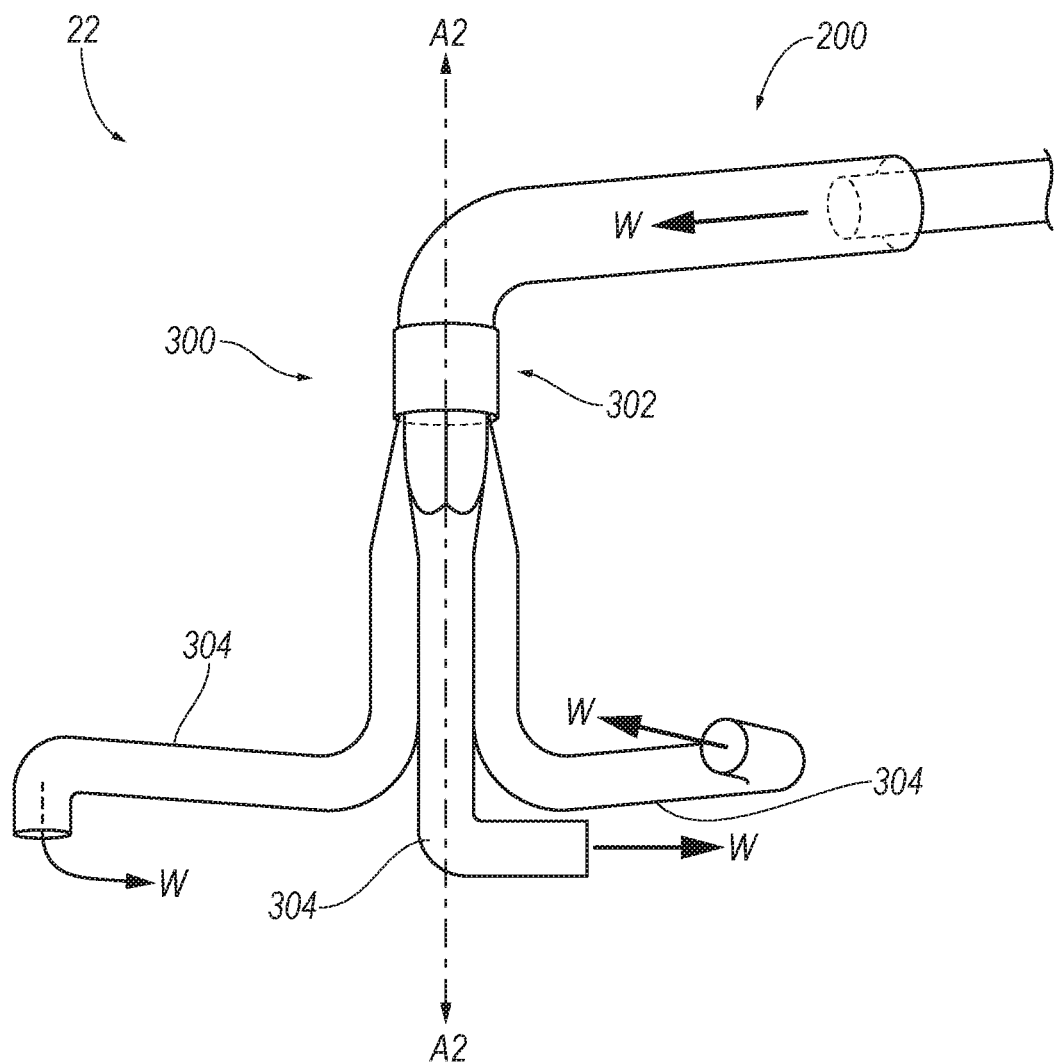
FIG. 4 shows another example wind plant.
Figure 5:
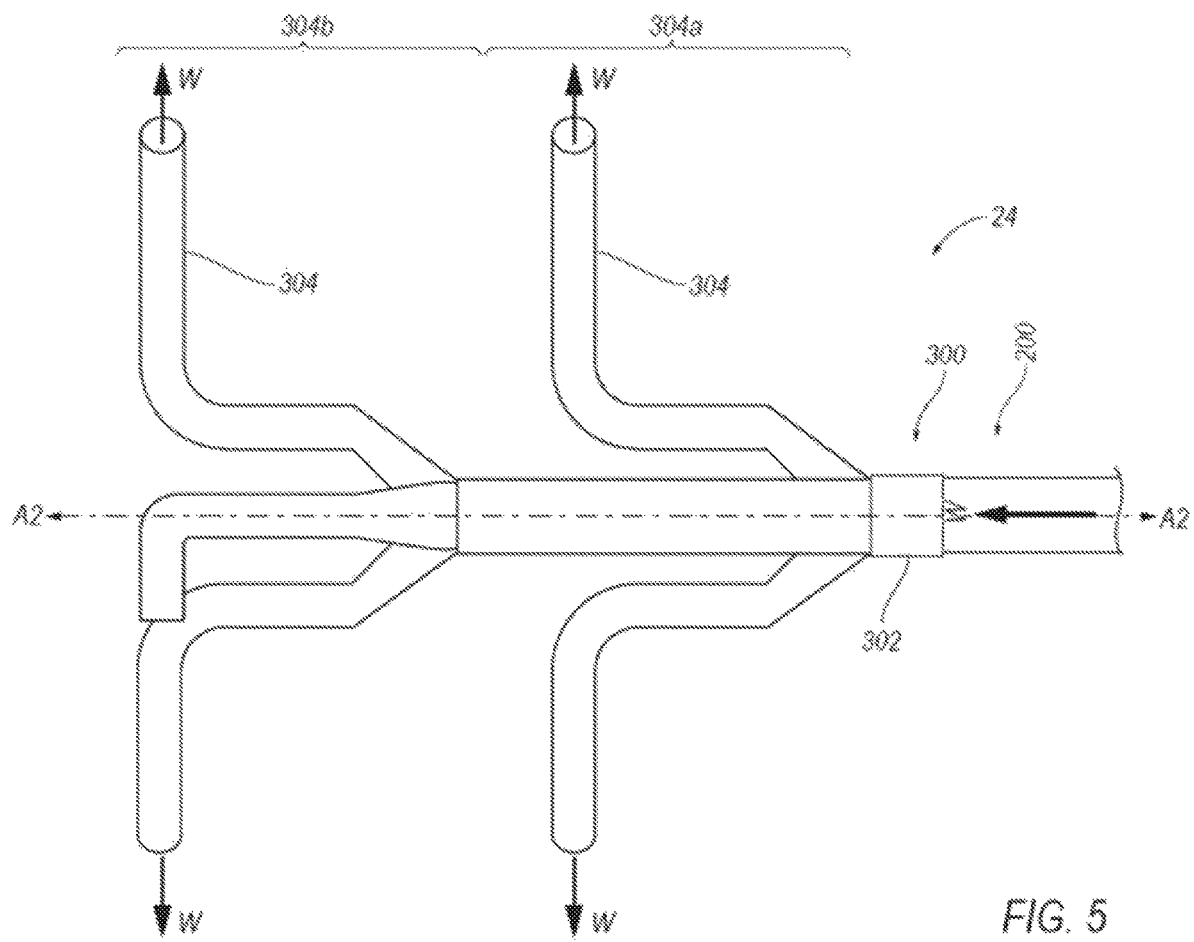
FIG. 5 shows yet another example wind plant.

FIG. 1 shows a wind plant 20 with a single first stage 100, a single booster arm 202 and a single exit conduit 304. However, multiple stages 100 and/or multiple booster arms 202 and/or multiple exits 304 could be used. FIG. 4 shows an example wind plant 22 with three exit conduits 304 that are in fluid communication with a common third stage 300. FIG. 5 shows an example wind plant 24 with five exit conduits 304 arranged in two stages 304a/304b. FIG. 6 shows another example wind plant 26 with multiple first stages 100, multiple booster arms 202 (one associated with each first stage), and multiple exit conduits 304 arranged in stages 304a/304b. Other configurations of the various stages 100/200/300/400 are also contemplated.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:
1. A wind plant, comprising:
at least one wind collector assembly configured to collect a wind stream wherein the at least one wind collector assembly includes an inner wind collector and an outer wind collector, a driving turbine associated with the outer wind collector, and a driven turbine configured to be driven by the driving turbine and associated with the inner wind collector;
at least one booster arm in fluid communication with the at least one wind collector assembly, the booster arm configured to receive the wind stream and to increase the flowrate of the wind stream; and at least one exit conduit, the at least one exit conduit in fluid communication with the booster arm and rotatable with respect to the booster arm, wherein the at least one exit conduit is configured to rotate with respect to the at least one booster arm in response to a thrust force generated by the wind stream exiting the exit conduit.

2. The wind plant of claim 1, wherein the driving turbine has blades, and the blades are rotated by the wind stream.

3. The wind plant of claim 2, wherein the blades of the driving turbine have a geometry such that the blades of the driving turbine are operable to create lift.

4. The wind plant of claim 3, wherein the driven turbine is configured to accelerate the wind stream.

5. The wind plant of claim 1, wherein the at least one booster arm is in fluid communication with the inner wind collector.

6. The wind plant of claim 1, wherein the at least one booster arm is in fluid communication with the at least one wind collector assembly via a channel, and wherein the at least one booster arm has an inlet with a first cross sectional area, the channel has a second cross sectional area, and the first cross sectional area is greater than the second cross sectional area.

7. The wind plant of claim 6, wherein an end of the channel is positioned inside the inlet of the at least one booster arm.

8. The wind plant of claim 6, wherein the inlet of at least one booster arm is configured to receive ambient air in addition to the wind stream.

9. The wind plant of claim 1, further comprising an electrical power generator assembly operatively coupled to the at least one exit conduit.

10. The wind plant of claim 9, wherein the electrical power generator assembly is operatively coupled to the at last one exit conduit via a shaft that is fixed to the at least one exit conduit and is configured to rotate with the at least one exit conduit.

11. A method of capturing energy from wind, comprising:
collecting wind in a wind collector assembly, wherein the wind collector assembly includes an inner wind collector and an outer wind collector, a driving turbine associated with the outer wind collector, and a driven turbine with the inner wind collector;

accelerating the wind by the driven turbine;

increasing the flowrate of the wind by moving the wind through a booster arm; and expelling the wind from an exit conduit, whereby a thrust force is generated on the exit conduit, causing the exit conduit to rotate with respect to the booster arm.

12. The method of claim 11, further comprising converting a torque associated with rotation of the exit conduit to electrical power.

13. The method of claim 11, wherein the inner wind collector is in fluid communication with the booster arm.

14. The method of claim 11, wherein the booster arm is in fluid communication with the wind collector assembly via a channel, and wherein the booster arm has an inlet with a first cross sectional area, the channel has a second cross sectional area, and the first cross sectional area is greater than the second cross sectional area.

15. The method of claim 11, wherein an end of the channel is positioned inside the inlet of the booster arm.

16. The method of claim 11, wherein the inlet of the booster arm is configured to receive ambient air in addition to the wind, and wherein the ambient air forms a boundary layer in this booster arm.

\* \* \* \* \*